Aug. 24, 1965     K. K. WALKER     3,202,332
LUGGAGE CARRIER
Filed April 22, 1963
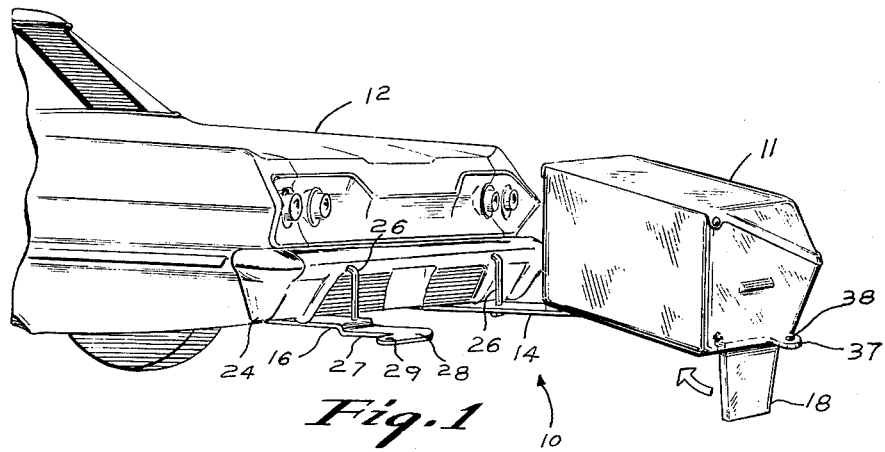
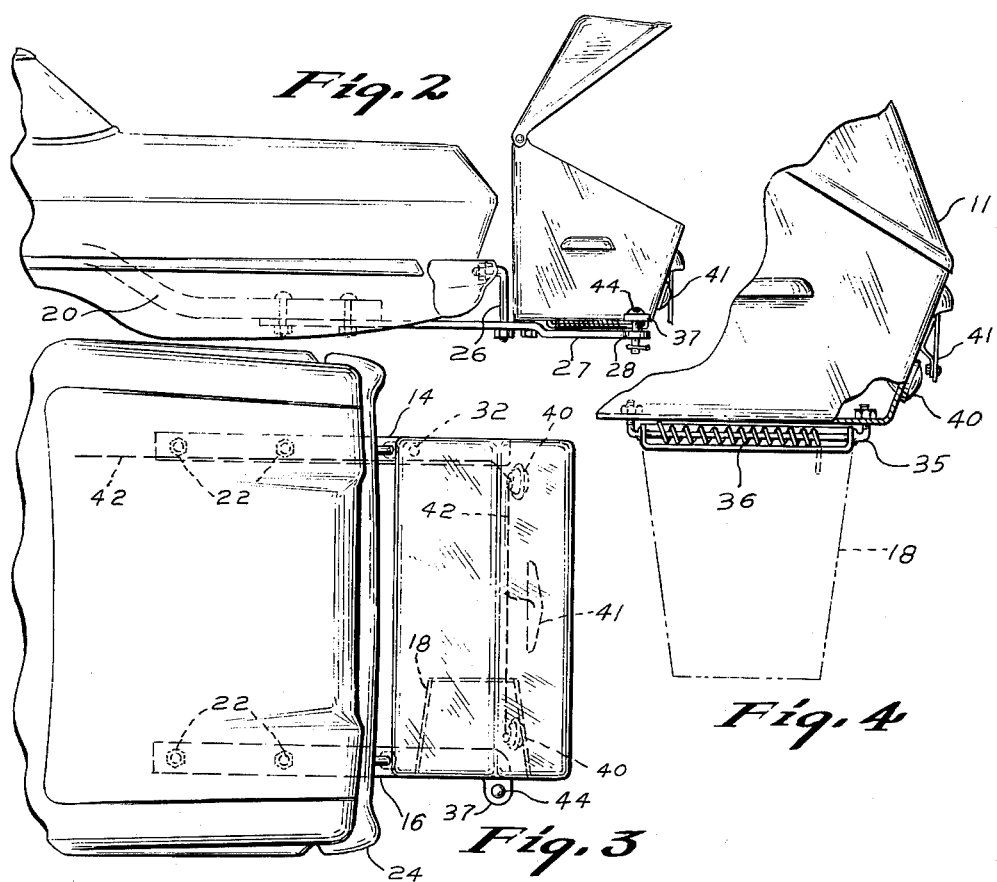
INVENTOR.
KEITH K. WALKER
BY
Dick, Zarley & Henderson
ATTORNEYS

United States Patent Office 3,202,332
Patented Aug. 24, 1965

3,202,332
LUGGAGE CARRIER
Keith K. Walker, Ruthven, Iowa
Filed Apr. 22, 1963, Ser. No. 274,717
6 Claims. (Cl. 224—42.03)

This invention relates to a luggage carrier and in particular to the supporting structure for mounting a trunk or the like at the rear of an automobile.

Heretofore it has been impractical to mount an auxiliary trunk or the like at the rear of an automobile because it made the luggage compartment of the automobile inaccessible.

Therefore, it is an object of this invention to provide a luggage carrier for an auxiliary trunk at the rear of an automobile which will readily permit swinging the auxiliary trunk to one side for easy access to the automobile trunk.

It is another object of this invention to provide a luggage carrier for an auxiliary trunk, which, when swung to one side of the automobile, is supported at one end by a support member connected to the automobile and at its other end by a foldable stationary support member engaging the ground.

It is a further object of this invention to provide an auxiliary trunk which may be horizontally pivoted on one of a pair of support members extending from the rear of an automobile.

It is another object of this invention to provide an automobile auxiliary trunk having a self-extending stationary support member.

It is another object of this invention to provide an automobile auxiliary trunk having a self-extending stationary support member so constructed that it will only pivot downwardly to a position perpendicular to the trunk.

It is another object of this invention to provide an automobile auxiliary trunk having a self-extending stationary support member which may be held when not in use in a folded position between the trunk and a support member provided on the automobile.

It is a further object of this invention to provide a luggage carrier which is economical to manufacture, durable in use and refined in appearance.

Various other objects and advantages will appear from the following description of one embodiment of this invention, and the novel features will be particularly pointed out hereinafter in connection with the appended claims and illustrated in the accompanying drawings in which:

FIG. 1 is an elevation perspective view of the rear end of an automobile with the auxiliary trunk swung outwardly to its open position;

FIG. 2 is a side elevation view of the luggage carrier with the auxiliary trunk in its normal position directly to the rear of the automobile;

FIG. 3 is a top plane view of the luggage carrier on the rear end of an automobile and illustrating in broken lines the supporting structure for the auxiliary trunk;

FIG. 4 is a fragmentary end elevation view of the auxiliary trunk and its extendable stationary support member in a folded position and by broken lines in its extended position.

The luggage carrier of this invention, generally referred to in FIG. 1 at 10 comprises a trunk 11 normally carried at the rear of an automobile 12 by a pair of support members 14 and 16. When the vehicle 12 is stopped, the trunk 11 may be swung to one side of the car and supported at its free end by a stationary support member 18.

The support members 14 and 16 extend beneath the auto on opposite sides and are secured at one end to the frame 20 (FIG. 2) by bolts 22 (FIG. 3). The other ends of the support members extend beyond the rear end of the car and are affixed to the lower edge of the rear car bumper 24 by L-bolts 26. The support member 16 is distinguished from member 14 by its outer end portion 27 which is disposed at a lower level and terminates in a transversely outwardly extending ear 28. An opening 29 is provided in the ear 28 for a purpose to be hereinafter described. The outer end of support member 14 is accordingly vertically higher but parallel to end 27 of member 16.

The trunk 10 is pivotally mounted on the outer end of member 14 by a bolt 32 (FIG. 3) extending through the bottom side wall of the trunk 10 near an end wall and inner side wall which are adjacent the rear end of the auto 12. The stationary support member 18 is mounted at the other end of the trunk 11 on the bottom side thereof. The member 18 is channel shaped and tapered along its length with its widest end pivoted by a U-shaped rod bracket 35 bolted to the trunk's bottom side. The rod 35 extends through the side flanges of the channel member and is embraced by a spring 36 which normally urges the support member 18 downwardly (FIG. 4).

At the lower corner diagonally opposite from the trunk's pivotal connection to the member 14 is provided an ear 37 extending outwardly from the trunk's adjacent end wall. An opening 38 is provided in the ear 37 which may be aligned with opening 29 in ear 28 as is later described.

When the trunk 11 is positioned at the rear of the auto 12 the tail lights and license plate will not be visible so auxiliary tail lights 40 have been provided on opposite sides of a license plate fixture 41 on the rear trunk wall (FIG. 3). A cable 42 (FIG. 3) of control wires is provided inside the trunk 11 connecting the tail lights 40 and a light for the license plate to the appropriate electrical circuits in the car. As shown in FIG. 3, the cable 42 extends through an opening in the trunk 11 at a point closely adjacent the bolt 32 pivotally connecting the trunk 11 to the support member 14. Thus, as the trunk is pivoted to and away from the car no strain will be placed on the cable 42 since the distance from outside of the trunk 11 to the car remains constant.

In the normal use of the luggage carrier 10 the trunk 11 will be positioned in either its closed position directly to the rear of the car (FIGS. 2 and 3) or its open position (FIG. 1) with its free end pivoted rearwardly to the side of the car. In the latter position easy access is provided to the trunk of the car 12.

In the closed position, the support member 18 is folded upwardly along the bottom side of the trunk 11 and fits in the space between the trunk 11 and the end portion 27 of the support member 16. The end portion 27 in turn being in engagement with the support channel member 18 is prevented from pivoting downwardly. The trunk 11 is locked in this position by a pin 44 extending through aligned openings 29 and 38 in ears 28 and 37 respectively.

When access to the luggage compartment of the automobile 12 is desired, the pin 44 is pulled and the auxiliary trunk 11 is swung rearwardly of the car. Simultaneously the stationary support member 18 is released and automatically pivots downwardly for supporting engagement with the ground to take the place of the car carried support member 16. The spring 36 normally biasing the support member 34 downwardly counteracts any tendency of the member to fold back toward the trunk, while the pivotal end of the channel member 18 being in engagement with the bottom side of the trunk 11 prevents the member 18 from pivoting beyond a position perpendicular to the trunk 11.

To return the trunk 11 to its closed position the stationary support 18 is folded up against the trunk's bottom side in the direction of the arrow in FIG. 1 and the trunk 11 is pivoted toward the rear of the car 12 until the conveniently located connecting ears 28 and 37 on the support member 16 and trunk respectively are positioned with their openings 29 and 38 respectively aligned. The pin 44 or a lock if desired, is then inserted in the aligned openings for positive locking of the trunk 11 on the supports 14 and 16 carried on the car 12.

Some changes may be made in the construction and arrangement of my luggage carrier without departing from the real spirit and purpose of my invention, and it is my intention to cover by my claims, any modified forms of structure or use of mechanical equivalents which may be reasonably included within their scope.

I claim:

1. In a luggage carrier for attachment to the rear end of an automobile, comprising first and second spaced apart support arms each having a first end portion adapted to be secured to an automobile, the first end portion of said first arm terminating in a downwardly extending portion which in a turn terminates in second portion extending parallel to said first portion, a container having a bottom side with one end pivotally secured to the free end of said second support arm, a third support arm pivotally connected to the container at the free end on the bottom side thereof, said third arm adapted to pivot upwardly against the bottom side of said container and be secured there by engagement with said second portion of said first support arm, said third support arm adapted to pivot downwardly for engagement with the ground upon said container being pivoted rearwardly of said first end portions of said first and second support arms;

and releasable means for engagement with said container and said first support arm for securing said container in a closed position extending transversely of said first and second support arms.

2. The structure of claim 1 wherein said third support arm is spring biased downwardly.

3. In a luggage carrier for attachment to the rear end of an automobile, comprising first and second spaced apart support arms each having a first end portion adapted to be secured to an automobile, the first end portion of said first arm terminating in a downwardly extending portion which in a turn terminates in second portion extending parallel to said first portion, a container having a bottom side with one end pivotally secured to the free end of said second support arm, a third support member being channel shaped at one end with the outer ends of the channel flanges being pivotally connected to the bottom side of the container at the container's free end, the pivotal end of said channel adapted to engage the bottom side of said container when the third support member is pivoted downwardly thereby limiting its pivotal movement, said third support member when in its position extending along the bottom of said container adapted to engage said second portion of said first support arm for supporting said container and preventing the downward pivotal movement of said third support arm;

and means for releasably securing said container to said first support arm.

4. The structure of claim 3 wherein said third support arm is provided with spring means to normally urge said third arm downwardly.

5. In a luggage carrier for attachment to the rear end of an automobile, comprising first and second spaced apart support arms each having a first end portion adapted to be secured to an automobile, the first end portion of said first arm terminating in a downwardly extending portion which in a turn terminates in second portion extending parallel to said first portion, a container having a bottom side with one end pivotally secured to the free end of said second support arm, a third support arm pivotally connected to the container at the free end on the bottom side thereof, said third arm adapted to pivot upwardly against the bottom side of said container and be secured there by engagement with said second portion of said first support arm, said third support arm adapted to pivot downwardly for engagement with the ground upon said container being pivoted rearwardly of said first end portions of said first and second support arms;

an ear portion provided on said first support arm extending outwardly beyond the exterior walls of said container when said container is in its closed position, said ear portion having an opening formed therein, and an ear portion formed on said container extending outwardly of its exterior walls and having an opening formed therein, said openings in said ear portions being in alignment when said container is in its closed position;

and a pin member provided in said openings and adapted to be removed to permit rearward pivotal movement of said container.

6. In a luggage carrier for attachment to the rear end of an automobile, comprising first and second spaced apart support arms each having a first end portion adapted to be secured to an automobile, a container having a bottom side with one end pivotally secured to the free end of said second support arm, a third support arm pivotally connected to the container at the free end on the bottom side thereof, said third arm adapted to pivot upwardly against the bottom side of said container and be secured there by engagement with said first support arm, said third support arm adapted to pivot downwardly for engagement with the ground upon said container being pivoted rearwardly of said first end portions of said first and second support arms;

and releasable means for engagement with said container and said first support arm for securing said container in a closed position extending transversely of said first and second support arms.

References Cited by the Examiner

UNITED STATES PATENTS

| 2,136,157 | 11/38 | Thomas | 224—29 |
| 2,574,465 | 11/51 | Clark | 224—42.21 |
| 2,701,728 | 2/55 | Miller | 224—42.04 |
| 2,982,431 | 5/61 | Moody | 224—42.03 |
| 3,039,634 | 6/62 | Hobson et al. | 224—42.03 |

GERALD M. FORLENZA, *Primary Examiner.*

HUGO O. SCHULZ, *Examiner.*